April 29, 1941.   P. SCHLUMBOHM   2,240,463
METHOD OF AND APPARATUS FOR FREEZING LIQUIDS
Filed March 17, 1938
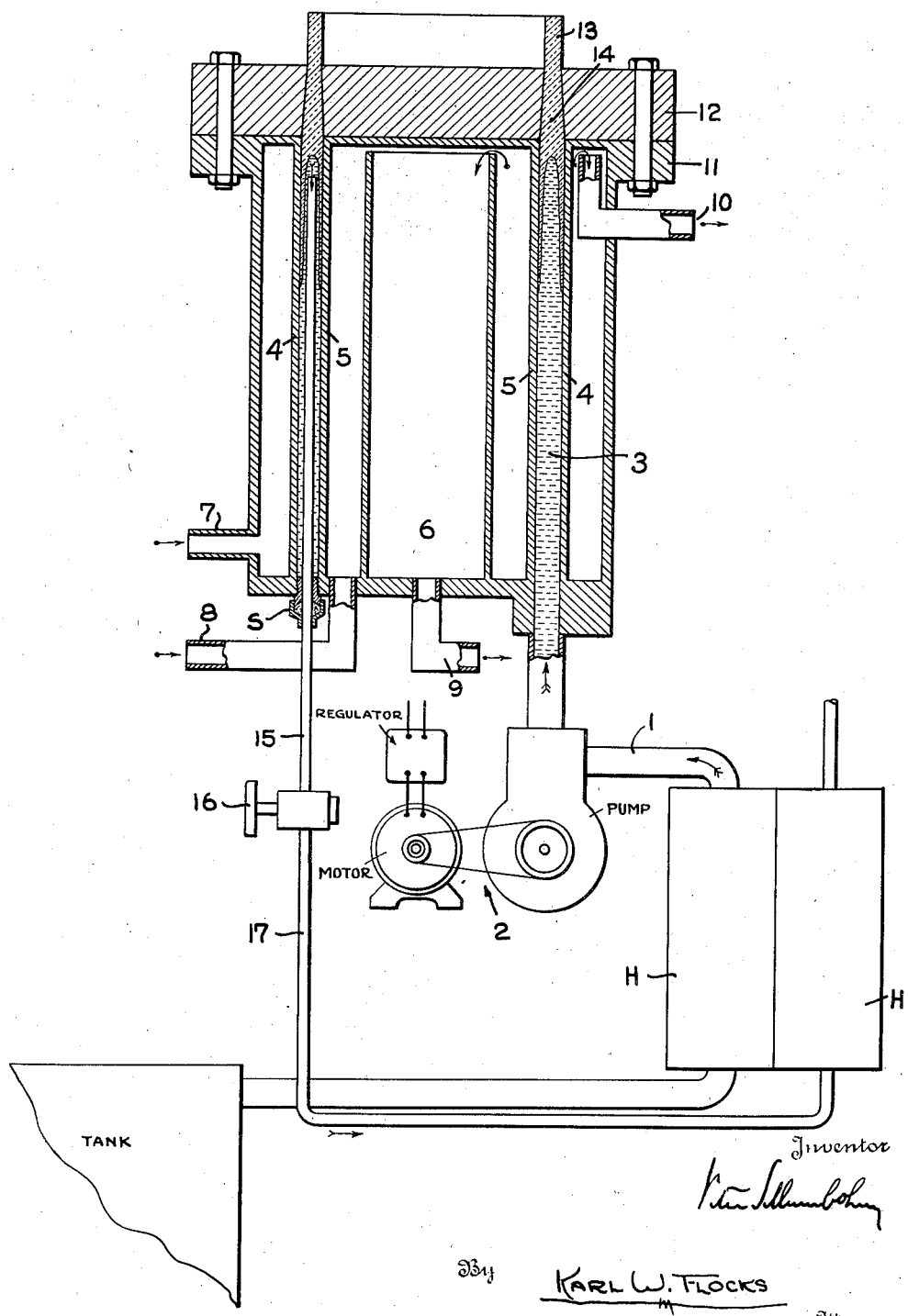

Patented Apr. 29, 1941

2,240,463

UNITED STATES PATENT OFFICE 2,240,463

METHOD OF AND APPARATUS FOR FREEZING LIQUIDS

Peter Schlumbohm, New York, N. Y.

Application March 17, 1938, Serial No. 196,331
In Germany March 17, 1937

21 Claims. (Cl. 62—106)

This invention relates to the freezing of fluids and more particularly to the continuous freezing of water ice and the concentration of solutions such as fruit juices, wines and milk.

The process will be described below in connection with the accompanying drawing wherein:

The figure is a schematic embodiment of the device shown generally in vertical section with parts in elevation.

The fluid or liquid to be frozen which may be water, fruit juice, wine or milk is subjected to the freezing action of suitable refrigerating means such as a volatile refrigerant, cold brine or solid carbon dioxide as indicated in Fig. 1. The fluid subjected to the refrigerating treatment enters the conduit 1 from a suitable storage tank and is forced by the pump 2 through the narrow ring-like passage 3 which may be termed a "freezing slit." The path taken by the fluid to be frozen is denoted in the drawing by the arrows with double feathers. Any unfrozen component of the fluid passed through the "freezing slit" 3 may be removed from the "freezing slit" by the conduit 15 as will be explained later. The path of the said unfrozen component is denoted in the drawing by the arrows with the single feather.

The "freezing slit" 3 is formed by the spaced cylinders 4 and 5 which preferably are of a material of good heat conductivity such as silver, copper or aluminum, and their surfaces forming the "freezing slit" are highly polished to reduce friction. If feasible, and in the case of aluminum, it is clearly feasible, the opposite surfaces of the cylinders are of dark color to improve heat transfer qualities and take advantage of the radiant heat as well as heat due to conduction.

The walls of the cylinders on the opposite sides of the "freezing slit" are intensely cooled by refrigerating means, and in the example illustrated in the drawing, cold brine enters the tube 7 to cool the wall of the cylinder 4. Cold brine also enters the tube 8 to cool the wall of the cylinder 5. In the first cooling circuit mentioned the brine leaves the cooling jacket around cylinder 4 through the tube 10, and in the latter circuit mentioned the brine leaves the inside of cylinder 5 through tubes 6 and 9. The flow of refrigerant is denoted on the drawing by the arrows with dots on their tail ends.

With this arrangement liquid under pressure from pump 2 may be frozen on its way through the "freezing slit" 3 and the equipment thus far described could effect a noncontinuous freezing operation or "batch" operation by the filling of the slit 3 with fresh water by the pump 2, allowing sufficient time for the total freezing of this mass of water into ice by the cooling action of the brine, interrupting said cooling action, replacing the cold brine with a heating medium such as warm water, condensing refrigerant, electric heating units, or the like, to thaw off the ice between the cylinders 4 and 5, and refilling the slit 3 with fresh water while discharging the tubular formation of ice frozen within the slit. While such process may be an advance over known methods of making ice, the instant invention has a broader scope, for it permits of continuous operation as distinguished from non-continuous or "batch" operation.

In order that the fluid to be frozen may be frozen continuously on its passage through the "freezing slit" 3 under the influence of the pressure of the incoming fluid to be frozen, I found it necesary to create a plug of ice which is sufficiently uniform in its resistance to be hydraulically forced out of the slit 3 in a uniform manner under the pressure of the pump 2. I found that for practical operation a "choke" section must be provided to obviate the formation of weak channels which have a tendency to appear in the middle of the ice where the distance from the cold cylinders 4 and 5 is the greatest as otherwise the incoming liquid breaks through these weak spots without building up the pressure required for the continuous uniform discharge of the frozen product. One way of obtaining this "choke" effect is to build the slit 3 conically with the axis of the cone being longitudinal with respect to the slit. Another way to provide a narrowing path or "choke" is to effect a cone formation at the end of the "freezing slit" 3 where the frozen product may be sent through a mill. However, for experimental purposes and also for obtaining varied working conditions commercially, I constructed a detachable nozzle head 12 which may be clamped to the freezing block 11 so that the nozzle 14 forms an extension of the "freezing slit" 3. Thus, nozzles of various restrictions may be used in connection with the same freezing block 11.

Forcing the ice through the nozzle involves the utilization of the plasticity of the ice. The actual degree of deformation or restriction of the nozzle may be small; for instance, a "freezing slit" with a width of 5 mm. may be coupled with a nozzle having a width of opening of 4 mm. for producing ice tube 13 having a wall thickness of 4 mm. Greater relative restrictions would require the expenditure of more power.

Further, I have found that the plasticity of the frozen product which may be ice may be best utilized when the operation is done with some degree of speed. Apparently, the process described is similar to that which takes place in the extruding of metals where optimal degrees of speed have also been observed.

In order to effect a relatively fast freezing speed, I prefer a narrow width of "freezing slit," say 4 mm., and a thin wall for the ice tube to be produced, say 3 mm. I consider it to be of great importance to cool the "freezing slit" from both sides through the walls of the cylinders 4 and 5. This features is an advance insofar as rapidity is concerned in that faster freezing may take place than that which is obtained in the prior art wherein cooled drums are dipped into water to be frozen. Moreover, in accordance with the instant invention, the ice is frozen in a structure having a symmetrical and uniform transverse cross section and a symmetrical longitudinal cross section.

This longitudinal cross section involves a generally parabolic curve separating the frozen product from the incoming liquid to be frozen as shown in the drawing wherein is depicted the curved line of separation between the ice as it is frozen and the incoming water. This results in favorable pressure angles in the direction of the nozzle 14. Under these conditions as described freezing speeds of several meters per minute of extruded ice tube 13 can be obtained. The length of the "freezing slit" 3 and the diameter of the cylinders 4 and 5 are functions of the temperature of the freezing medium and may be calculated together with the other thermodynamic factors and structural features of the equipment.

In accordance with the invention, means are provided to withdraw the non-frozen component from the "freezing slit" while the slit is fed with incoming liquid under pressure by the pump 2, and while ice or frozen product is extruded through the nozzle 14. The means referred to is illustrated by way of example in the drawing by the tube 15, the discharge conduit or tap 17, and a pressure control device 16, the parts being so correlated that the pressure control device 16 is influenced by the pressure in the tube 15 and controls the flow through the conduit 17 by opening and shutting it in the manner known to the art wherein pressurestatic valves are more or less common. By means of this tube 15, the "core-water" which is richer in salts than the fresh or incoming water, and which appears in the standard cell-freezing equipment in the core of the cell, and in the present case appears at the border between the ice and fresh water, may be withdrawn from the "freezing slit" while maintaining the pressure in the slit by the pressure controlled valve 16 between the conduit 15 and the conduit 17. By following this method and utilizing the equipment as described, the ice tube 13 may be optically clear ice, whereas otherwise if the salty core water were included in the product, it would be non-clear or "optically diffuse."

The method and equipment described can be used for purposes other than the freezing of ice, as already mentioned. For example, liquids may be concentrated by freezing out the water. In this case, the "core" is the concentrate and the main product; the ice being merely a byproduct. The concentrate would then be indicated in the drawing by the arrows with the single feather.

For this special operation, the nozzle 14 becomes of particular importance. In all previous attempts to concentrate liquids by freezing out the water, the difficulty was that the formed ice mechanically included a great deal of concentrate. The only practical way out of this difficulty was found to involve the centrifuging of the mixture of ice and concentrate, but such procedure made the process non-continuous. In accordance with the instant invention, the concentrate is separated from the formed ice by the "squeeze" or "choke" to which the ice is subjected when it approaches the nozzle 14. This step may be likened to the wringing of the liquid out of a wet towel. In a similar manner the concentrate is separate from the ice which leaves through the nozzle. From the conduit 17 the concentrate may be pumped or led under its own pressure into storage containers. It is practical to provide a countercurrent heat exchanger H between the cool concentrate leaving the tap 17 and the relatively warm incoming liquid entering the tube 1.

The degree of concentration of the liquid leaving the conduit 17 may be effected by regulating the pump 2 which is preferably of a controllable character as is well known in the art. The pressurestatic device 16 may also be adjusted in correlation to the regulation of the pump 2 to effect the degree of concentration desired.

As the ice 13, in this latter operation, may be a byproduct, it may be used to precool the incoming liquid or to cool the condenser of the refrigeration machine which produces the cold required to freeze the tubular ice product 13.

The means for withdrawing the liquid from the "freezing slit" 3 is shown in the drawing as the tube 15 which is associated with the device in an adjustable manner so that the right height of the tube 15 may be effected. The tube 15 is inserted through the wall of the "freezing slit" 3 and adjusted therethrough without loss of liquid therein for the stuffing box S acts as a seal between the "freezing slit" and the exterior of the device, whereby the tube 15 is slidable toward and from the nozzle.

Instead of using a single tube 15, two concentrically arranged tubes, one within the other, the diameters of which would be less than the diameter of the cylinder 4 and greater than the diameter of the cylinder 5, could be inserted into the "freezing slit," and the space between them would be connected with the pressure controlled valve 16 associated with the tap or discharge conduit 17. This arrangement would provide an annular opening for the outflowing liquid component with uniform withdrawal level of liquid from and throughout the "freezing slit."

The cross section of the ring-like "freezing slit" and the continuation thereof in the nozzle head 12 is preferably round. However, this may be varied and a cross section of square, oval, star or undulated design may be chosen if it is desired to produce a fancy or ornamental profile shape for resulting tube ice product 13, or such design may be chosen in order to effect an increased heat exchange surface per unit length of "freezing slit" or for other reasons.

The equipment described and illustrated may be supplemented by the addition of heat insulating jackets, automatic temperature control devices, safety controls and other conventional apparatus.

It will be obvious to those skilled in the art that various changes may be made in this invention without departing from the spirit thereof and therefore the invention is not limited to what is shown in the drawing and described in the specification but only as indicated in the appended claims.

I claim as my invention:

1. The method of refrigeration comprising: forcing under pressure a thin wall of liquid comprising: a component to be frozen through a narrow freezing space, refrigerating said freezing space, forcing ice particles after they are formed in said freezing space from said freezing space, removing the non-frozen liquid component from said freezing space, and compacting the frozen component.

2. The method of separation by refrigeration comprising: passing under pressure a thin wall of liquid to be separated through a narrow freezing space, refrigerating said freezing space on two sides, forcibly ejecting the crystals selectively formed in said freezing space from said freezing space, removing the non-frozen component of the liquid to be separated from said freezing space.

3. The method recited in claim 2 and controlling the pressure of the liquid within the freezing space by controlling the flow from the freezing space of the non-frozen component.

4. The structure recited in claim 2 and passing the non-frozen component of the liquid in heat exchange relation with the incoming liquid to be separated.

5. The method of freezing liquids comprising: the steps of feeding liquid, having a freezing component and a non-freezing component, under pressure into a freezing space; maintaining the pressure in said space; refrigerating said space; eliminating the non-frozen component independently of said frozen component from said freezing space while maintaining the pressure therein.

6. The method recited in claim 5, and the step of eliminating the frozen component from said freezing space by utilizing the pressure therewithin.

7. The method of producing a clear water ice including the steps set forth in claim 5 wherein the non-frozen component which is withdrawn is the "core water."

8. The method of concentrating fruit juices in accordance with the steps set forth in claim 5 wherein the frozen component is water ice and the non-frozen component is the concentrate.

9. The method of concentrating wine in accordance with the steps set forth in claim 5 wherein the frozen component is water ice and the non-frozen component is concentrated wine.

10. The method of concentrating milk in accordance with the steps set forth in claim 5 wherein the frozen component is water ice and the non-frozen component is concentrated milk.

11. Refrigeration apparatus comprising: walls forming an elongated narrow freezing space of ring-like cross section, means for refrigerating said freezing space on the inside and on the outside, means for forcing liquid, having a freezing component and a non-freezing component, under pressure through said narrow space, means forming a constriction adjacent the outlet of said freezing space in order to constrict or compress the frozen component as it leaves the apparatus, and means for withdrawing the non-frozen component from said freezing space independently of said frozen component.

12. The structure recited in claim 11, means for withdrawing the non-frozen component from said freezing space, and means for controlling said withdrawal means in order to maintain a desired pressure in said freezing space.

13. The structure recited in claim 11 and means for passing the discharged non-frozen component in heat exchange relation with the liquid being passed to said apparatus to precool the same.

14. Refrigeration apparatus comprising: walls forming an elongated narrow freezing space, means for refrigerating said freezing space on at least two sides, means for forcing liquid, having a freezing component and a non-freezing component under pressure through said narrow space, means forming a constriction adjacent the outlet of said freezing space in order to constrict or compress the frozen component as it leaves the apparatus, and means withdrawing the non-frozen component independently of said frozen component from said freezing space.

15. The structure recited in claim 14, means for withdrawing the non-frozen component from said freezing space, said last mentioned means being adjustable whereby the level at which withdrawal takes place may be varied.

16. The method of concentrating liquids comprising the steps set forth in claim 14, and means controlling the pressure of the liquid passed to the freezing space.

17. A method of refrigeration comprising the steps set forth in claim 14, effecting the refrigeration of said freezing space by compressing, condensing and expanding a volatile refrigerant, and passing the frozen component in heat exchange relation with the refrigerant to be condensed.

18. The method of refrigeration including the steps set forth in claim 2, and passing the frozen component in heat exchange relation with the liquid to be cooled.

19. The method of refrigeration including the steps set forth in claim 2, and utilizing the frozen component to aid in the refrigeration of said freezing space.

20. The method of producing a continuous extruded mass of solid water ice, comprising; feeding under pressure water to be frozen into a freezing space, refrigerating said space to a freezing temperature and maintaining the pressure therewithin to force the medium from the freezing space and continuously constricting the medium sufficiently to form a continuous extruded solid mass of water ice.

21. The method recited in claim 20, the last mentioned step comprising extruding the ice in the shape of a tube.

PETER SCHLUMBOHM.